United States Patent [19]

Heller

[11] 4,245,392
[45] Jan. 20, 1981

[54] DEVICE FOR MEASURING AND ADJUSTING THE LIE AND FACE OF GOLF CLUB

[76] Inventor: Walter R. Heller, 4 N 321 Rte. 53, Addison, Ill. 60101

[21] Appl. No.: 114,732

[22] Filed: Jan. 24, 1980

[51] Int. Cl.³ .............................................. G01B 5/24
[52] U.S. Cl. .................................... 33/174 F; 72/293
[58] Field of Search .................... 33/174 F; 273/32 B, 273/32 R; 72/293

[56] References Cited

U.S. PATENT DOCUMENTS

| | | | |
|---|---|---|---|
| 2,546,426 | 3/1951 | Bryant | 33/174 F |
| 3,631,602 | 1/1972 | Noiel | 33/174 F |
| 4,094,072 | 6/1978 | Erb | 33/174 F |

Primary Examiner—Willis Little
Attorney, Agent, or Firm—Robert L. Lindgren; Lloyd L. Zickert

[57] ABSTRACT

A device for measuring and adjusting the angle of lie and face angle of a golf club including a club head supporting base with a reference surface for supporting the sole of a golf club. A measuring element is indexed to the reference surface to contact the face of a golf club and to indicate the face angle thereof.

A shaft supporting and club adjusting structure is secured to the base and includes measuring apparatus referenced to the sole reference surface for measuring the lie angle of the golf club and for producing golf club adjustments to selectively vary the lie and face angles of the golf club.

18 Claims, 7 Drawing Figures

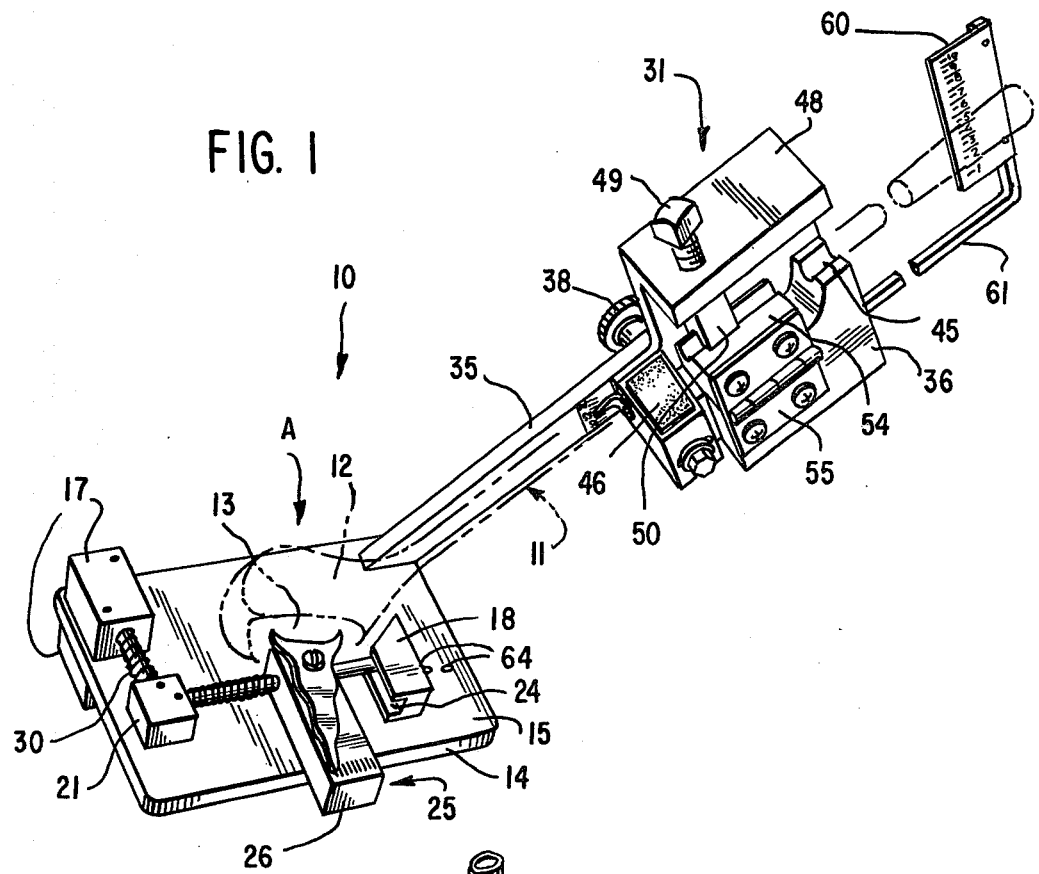

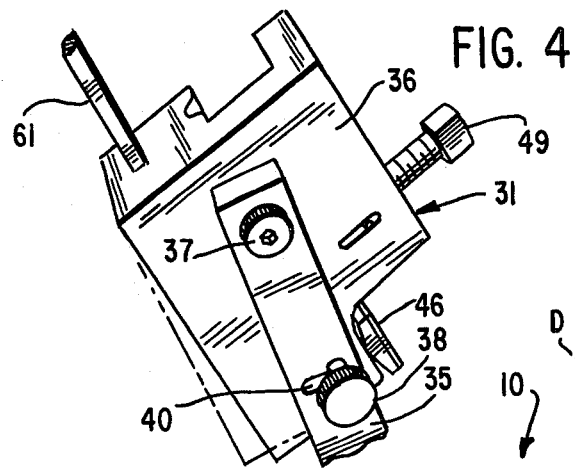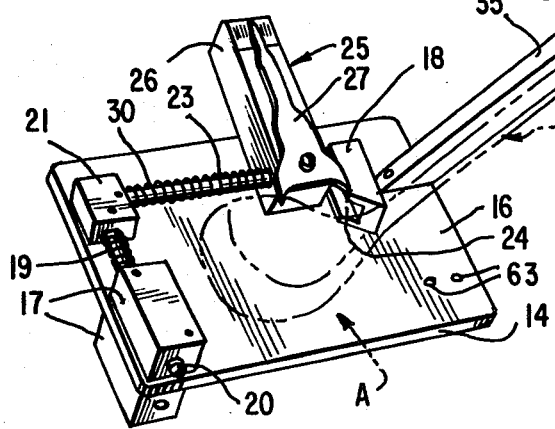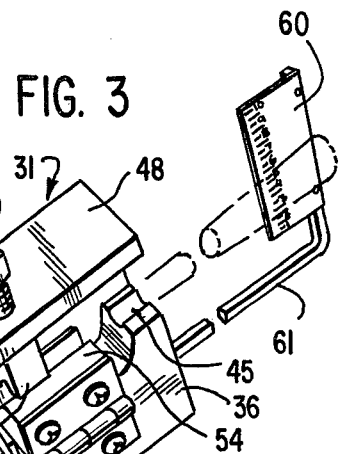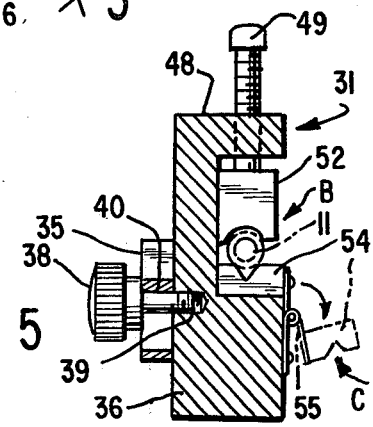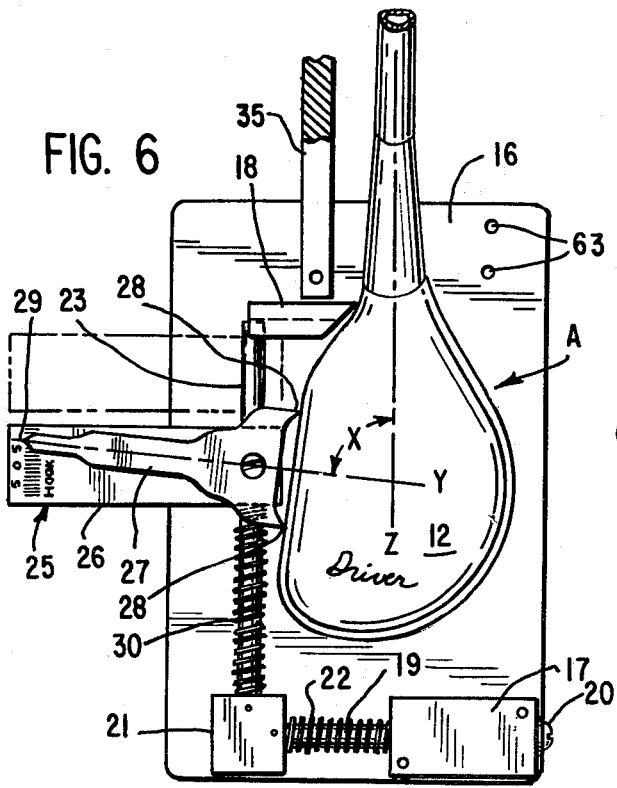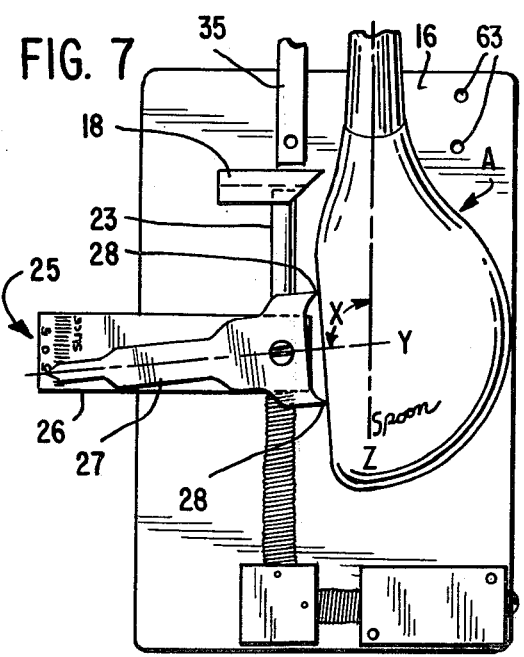

DEVICE FOR MEASURING AND ADJUSTING THE LIE AND FACE OF GOLF CLUB

BACKGROUND OF THE INVENTION

This invention relates to a golf club measurement and adjustment device which is particularly useful for fitting the lie of a wood to the individual golfer.

Of increasing importance to the continued improvement of the play of serious golfers is the custom fitting of woods to the varying needs of potential golf club purchasers. Of particular importance is the need to customize woods to provide a lie and face angle which correctly relate each particular wood to the user's stance, arm length and style of play.

Since custom designing is extremely time consuming, it is also expensive. Few golfers have the economic means to have a set of golf clubs custom designed for them. The present invention provides a simple device for efficiently and quickly producing precise gauging and adjustment of golf clubs to the individual player.

THE PRIOR ART

In the prior art of which Applicant is presently aware, the U.S. Pat. No. 2,973,581, to RHODE-HAMEL describes a device which can be used to calibrate both the loft and lie of an iron. The calibration device of this patent is designed for use with an independent wrench to impart a bending force to the hosel of the iron once the head of an iron has been securely clamped between a pair of flanges.

A commercially available device is known to the Applicant which may be used to measure the face angle and the angle of lie of woods or irons. The object of this device is simply to measure the critical dimensions of a golf club but is not intended for adjusting.

Applicant's co-pending U.S. patent application, Ser. No. 06/057,218, filed July 13, 1979, discloses a golf club adjusting apparatus for modifying the relationship of the golf club shaft and head through the application of a force at a point intermediate the head of the golf club and a second point upwardly therefrom on a golf club shaft. However, the device of Applicant's co-pending Application does not include a device for precision measuring and adjusting of the face and lie angles of a golf club.

The apparatus of the present invention provides for quick and efficient measurement and adjustment of the angle of lie and face angle of the golf club. The prior art devices, because of their construction and operation, were generally limited to performing either measurement or adjusting functions and typically required expensive additional equipment and time consuming disassembly to accomplish the other functions. However, the present invention does not require separate devices for gauging and adjusting the golf club. In addition, the structural simplicity of the apparatus of the present invention makes possible its use by those having a minimal amount of mechanical skill thereby overcoming many of the problems associated with the prior art devices.

SUMMARY OF THE INVENTION

The invention includes a device for both measuring and adjusting the angle of a lie and face angle of a golf club and is particularly designed to support the sole of the club head upon a reference surface in a first position so that the face angle and angle of lie of the golf club may be precisely measured. With the head supported in this manner, a measuring device is moved into contact with the face of the golf club so that a pointer and associated angle scale thereon will indicate the precise angular amount of hook or slice present in the ball hitting face of the golf club. The golf club may then be moved to an adjustment position where the angles of lie and face may be selectively adjusted. The golf club is held in the first position by a supporting device which is connected to the reference surface by a bracket arm which is removably secured to both. The supporting device includes elements which may apply a deflecting force to the golf club shaft to adjust the geometry of the wood head with respect to the shaft to accommodate the needs of the particular golfer.

BRIEF DESCRIPTION OF THE PREFERRED DRAWINGS

For a more complete understanding of the invention, reference is made to the drawings, in which:

FIG. 1 is a perspective view of the device of the present invention;

FIG. 2 is a partially sectioned top plan view of the device of FIG. 1;

FIG. 3 is a perspective view of the device of the present invention assembled for use with left handed golf clubs.

FIG. 4 is a perspective view of the support portion of the device of the present invention.

FIG. 5 is a sectional view of the device of FIG. 3 taken generally along line 5—5 of FIG. 3;

FIG. 6 is a partially sectioned top plan view of the device of FIG. 3; and

FIG. 7 is a partially fragmented top plan view of the device of FIG. 3.

DESCRIPTION OF THE PREFERRED EMBODIMENT

Referring now to the Drawings, FIG. 1 shows a device for measuring and adjusting the angle of lie and face angle of a golf club and is generally designated by the reference numeral 10. The angle of lie is the angle defined by the intersection of the axis of a golf club shaft 11 and the plane of the sole portion of the wood golf club head 12. The face angle is the angle X defined by lines Y and Z in FIGS. 2, 6 and 7 as determined by the angular relationship of the axis Z of the club shaft and the plane of the club face.

As can readily be seen from FIGS. 1, 3, 6 and 7, the device 10 can be used to measure and adjust either right or left handed woods. The device is provided with a base element 14 having first and second reference surfaces 15 and 16 for use with right and left handed golf clubs respectively. The reference surfaces 15 and 16 are on opposite sides of the base element 14 to allow the device to be quickly disassembled and reassembled for right or left handed golf clubs. The base element is constructed by appropriately cutting and milling a piece of sheet steel.

A pair of first and third blocks 17 and 18 are secured, one of each pair to the first and second reference surfaces 15 and 16 in mirror image fashion. The first blocks 17 are bored to slidably receive a first shaft 19 for reciprocating movement thereon. The first shaft 19 is threaded to removably receive a cap 20 which serves as a stop to maintain the first shaft 19 in the first block and to limit the reciprocating movement of first shaft 19 in one direction with respect to the first block 17.

To the end of the first shaft 19 opposite the cap 20 is affixed a second block 21 which is disposed for reciprocating movement with the first shaft 19 along the axis thereof. The second block also serves to limit movement of the first shaft 19 in one direction with respect to the first block 17. The first and second blocks 17 and 21 are normally biased apart by a first biasing spring 22 which is telescoped over the first shaft to provide for smooth and easily returnable reciprocating movement of the first shaft 19 relative to the first block 17.

A second shaft 23 is fixed to the second block 21 for reciprocating movement therewith so that the axis of the first and second shafts 19 and 23 are perpendicular to each other and may travel only in a direction parallel to the reference surface 15 or 16 that they are mounted upon. The third blocks 18 on each reference surface 15 and 16 are provided with channels 24 best seen in FIGS. 1 and 3 to receive the end of the second shaft 23 opposite the second block 21 to guide the second shaft 23 as it moves in a path perpendicular to the axis of shaft 19 while remaining in parallel alignment with the reference surface 15 or 16.

A face angle measuring device generally designated by the reference numeral 25 in FIGS. 1 and 3 includes a fourth block 26 which is bored to slidably receive the second shaft 23 so that the fourth block is free to reciprocate on the axis of shaft 23 while remaining in parallel alignment with the plane of base 14. An indicator 27 is pivotally attached to the top of the fourth block 26 and includes a pair of points 28 for contacting the golf ball hitting face 13 of a golf club along a line parallel to the reference surface 15 or 16 when the golf club is in any of the positions illustrated in FIGS. 1, 2, 3, 6, and 7, or the measuring position shown by the reference arrow A, wherein the sole or underside of the golf club head 12 is evenly and stably resting on the proper reference surface 15 or 16. As can be best seen in FIGS. 2, 6 and 7, pointer 29 at the end of the indicator 27 opposite the points 28 moves proportionately to the face angle of the ball hitting surface 13 and aligns with an angle indicator atop the fourth block 26 to visually display the face angle measurement in degrees of hook or slice. As can be best viewed in FIG. 2, points 28 are positioned on a line perpendicular to line Y which extends from pointer 29 and thereby define a line normal to the axis of pointer 29. The second and four blocks 21 and 29 are normally biased apart from a second biasing spring 30.

In operation, the face angle measuring device 25 is moved in a plane parallel to the reference surface 15 or 16 or the plane of base 14 along the axis of shaft 23. Mounting of cap 20 onto the end of the first shaft 19 allows the face angle measuring device 25 to be removably secured for this movement to either reference surface 15 or 16. Removal of the cap 20 allows the face angle measuring device 25, first shaft 19, second block 21, first biasing spring 22, second shaft 23, and a second biasing spring 30 to be removed as a unit and reassembled as a unit on the opposite reference surface 15 or 16 after removal and inversion of the fourth block 26 on the second shaft 23.

Referring now to FIGS. 1, 3, 4 and 5, the shaft 11 of the wood is supported by a supporter generally designated by the reference numeral 31, generally of the type device which is the subject of Applicant's co-pending U.S. patent application, Ser. No. 06/057,218 filed July 13, 1979, and shown as removably secured to either reference surface 15 or 16 by a bracket arm 35. The supporter 31 includes a body 36 which includes a threaded hole to receive bolt 37 shown in FIG. 5, which is first inserted through a passage near the upper end of the bracket arm 35 to connect the body 36 thereto.

The pivotal movement of the body is controlled by tightening or loosening a control knob 38 shown in FIGS. 1, 3, 4 and 5 which is threaded into an aperture 39 in the body as shown in FIG. 5. A portion of the control knob 38 rides in arcuate slot 50 to limit the pivotal movement of the body 36 to a predetermined degree of arc.

Referring now to FIGS. 1, 3 and 5, the body 36 is provided with a groove 45 for engaging or supporting the shaft 11 of a golf club at first point. A padded member 46 for engaging or supporting the golf club shaft 11 is provided at a second point on the body 36 spaced from the first point.

An upper flange 48 of the body 36 is provided with a threaded hole for receiving bolt 49 to reversibly move a pressure shoe 50, which is affixed to the end of the bolt by a ball and socket joint, into contact with the shaft 11 of a golf club at a third point intermediate the first and second points.

A grooved plate 54 is pivotally secured to the body 36 by a hinge 55 for movement from a primary position indicated by reference letter B in FIG. 5 to a secondary position C shown in phantom in FIG. 5. In position B hinged plate 54 is aligned with groove 45 in predetermined relation and to provide additional shaft support and is held in place thereon to pressure shoe 50 between the first and second club engaging or supporting points. With the grooved plate 54 thus in the primary position, the golf club as shown in FIG. 5 may be retained in a selected position after the body 36 has been adjusted by the control know 38 for adjustment of the golf club's angle of lie.

With the grooved plate 54 in the secondary position, or out from between the first and second points as indicated by reference arrow C in FIG. 5, sufficient rotation of bolt 49 will move the pressure shoe 50 to cause controlled deflection on the golf club shaft 11. This controlled deflection can be utilized to alter the shaft 11, club face and sole relationship and thus, the angle lie and face angle of the golf club when the club head 12 is disposed in the adjustment indicated by reference arrow D in FIG. 3.

A second measuring pointer 58 is provided on the body 36 to align with an angle scale applied on the bracket arm 35 as shown in FIGS. 1 and 3, and visually indicates the angle of lie of a golf club in the first position A after the body has been adjusted by use of the control knob 38.

An indicia bearing indicator plate 60 is mounted on the body 36 by an angle bracket 61 to visually indicate the amount of adjustment being imparted to a golf club in the adjustment position shown in FIG. 3.

The base element 14 is provided with two pairs of passages 63 and 64 which receive attachment elements to removably secure the bracket arm 35 to either reference surface 15 or 16 for right or left hand operators.

In operation, the device 10 is first set up for use with right or left handed golf clubs by mounting the fourth block 26 on reference surface 15 and 16 as already discussed. The golf club is then placed in the first position A with the sole evenly resting upon one of the reference surfaces 15 or 16, the club shaft 11 extending through the supporter 31 and the grooved plate 54 in the primary position B. The body 36 of the supporter 31 is then adjusted with the control knob 38 to pivot to a position consistent with the angle of lie of the club, and the pressure shoe 50 is brought into engagement with the club shaft 11. The angle of lie is then visually read from the bracket arm 35 indicia with thread of the pointing element 58. The points 28 of the indicator 27 are then moved into contact with the ball hitting face 13, and a reading of the face angle is thus visually read from the fourth block with the aid of the pointer 29.

After these steps are completed, the pressure shoe 50 is moved out of engagement with the club shaft 11, the club shaft removed from the supporter 31, and the grooved plate 54 moved to the secondary position. The golf club is then repositioned in the supporter 31 in the adjustment position D and the pressure shoe 50 is brought into engagement with the club shaft 11. With the club thus positioned, the bolt 49 and pressure shoe 50 are utilized to apply a deflecting force to the club shaft 11 and the desired adjustments can be made.

The exact measurements of the altered club may then be obtained by again sliding the club to the first position A and repeating the measurement procedure.

What I claim is:

1. A device for measuring and adjusting the angle of lie and face angle of a golf club having a shaft and a head at one end with a ball hitting face and sole, said device comprising:
   a base element including a generally flattened reference surface for evenly supporting the sole of the golf club thereon when the golf club is in a first position;
   means spaced from said base element for supporting the shaft when the golf club is in said first position;
   means for attaching said shaft supporting means to said base element;
   means on said attaching means and said shaft supporting means coacting to measure the angle of lie;
   means coacting with said base element for measuring the face angle including means for engaging the ball hitting face when the golf club is in the first position;
   means for connecting said face angle measuring means to said base element;
   and means on said shaft supporting means for adjusting the angle of lie and the face angle when the golf club is in a second position in a predetermined oriented relation only with respect to said shaft supporting means.

2. The device of claim 1 wherein the means for measuring the face angle is movably mounted on the base element to move in a plane generally parallel to the reference surface, and to a position for measuring the face angle.

3. The device of claim 2, wherein the means for connecting said face angle measuring means includes a first shaft; a first block secured to the base element, said first block having a bore to receive the first shaft to allow the first shaft to be reciprocated therein; cap means on one end of the first shaft to limit movement of the shaft in one direction relative to the first block; a second block secured to the other end of the first shaft to be reciprocal therewith and limit movement of the first shaft relative to the first block; a second shaft secured to second block in a preselected angular relationship to the axis of the first shaft; a third block secured to the base element, said third block including a channel to engage and guide the end of the second shaft opposite the second block to allow movement of said second shaft in a direction according to said preselected angular relationship.

4. The device of claim 3 wherein the means for measuring the face angle includes a fourth block carried by the second shaft, an indicator pivotally attached to said fourth block said indicator having a least two points for contacting the ball hitting face when the golf club is in the first position and pointer means for indicating the face angle of the golf club.

5. The device of claim 4 wherein the fourth block has a bore to receive the second shaft to allow the fourth block to be reciprocal thereon along the axis of the second shaft.

6. The device of claim 5 wherein the first and second blocks are normally biased away from each other by a first biasing element.

7. The device of claim 6, wherein the second and fourth blocks are normally biased away from each other by a second biasing element.

8. The device of claim 1, wherein the shaft supporting means includes:
   a body having first means for engaging the golf club shaft at a first point when the golf club is in the first or second position;
   second means for engaging the club shaft at a second point spaced a predetermined distance from the first point, when the golf club is in the first or second position; and
   a third means for engaging the club shaft attached to the body at a third point intermediate the first and second points when in a primary position to coact with the adjusting means to grip the club shaft and said third means being movable to a secondary position wherein the means for adjusting may coact with said first and second means to produce controlled deflection of the club shaft.

9. The device of claim 8, wherein the adjusting means includes a pressure shoe for reversibly moving pressure shoe means into contact with the club shaft at the third point to apply a deflecting force thereto.

10. The device of claim 8, wherein the position of the body may be adjusted relative to the reference surface to accommodate golf clubs having different angles of lie.

11. The device of claim 10, wherein the body is removably connected to the reference surface by a bracket arm.

12. The device of claim 11, wherein the means for measuring the angle of lie comprises:
   indicia on the bracket arm corresponding to the position of the body relative to the reference surface, and a pointing element on the body which aligns with the indicia to indicate the angle of lie when a golf club is placed in the means for supporting and is in the first position.

13. The device of claims 9 or 12, wherein the body includes means for visually illustrating the amount of adjustment imparted to a club placed in the shaft supporting means in the second position.

14. A device for measuring and adjusting the angle of lie and face angle of the golf club having a club shaft and a head at one end with a ball hitting face and a sole, the device comprising:
   a base element including first and second generally flattened reference surfaces for evenly supporting the sole of left and right handed golf clubs respectively thereon; means spaced from said base element for supporting the club shaft when the club is in a first position wherein the shaft supporting means is removably attachable to either the first or second reference surface; means carried by said shaft supporting means for adjusting the angle of lie and the face angle when the golf club is in a second position in a predetermined oriented relation only with respect to the shaft supporting means; and means mountable on the first or second reference surface for measuring the face angle of right or left handed golf clubs when the club is in the first position including means for engaging said hitting face.

15. The device of claim 14, wherein the means for measuring the face angle is alternatively mountable on either the first or second reference surface by a means for indexing the means for measuring the face angle to move in a plane generally parallel to the plane of the reference surface to which it is mounting comprising:

a first shaft;

a pair of first and third blocks, wherein one each of said pairs is affixed in spaced mirror image fashion on each of said reference surfaces, wherein the first blocks slidably receive the first shaft;

stop means removably securable to an end of the first shaft to limit movement of the shaft in one direction relative to the first block;

a second block which is secured to the other end of the first shaft to be reciprocal therewith and limit movement of the first shaft in one direction relative to the first block;

a second shaft secured to the second block in a preselected angular relationship to the first shaft and to be reciprocal with the second block along the axis of the first shaft; wherein the third blocks include channels for receiving the end of the second shaft opposite the second block to allow the second shaft to be reciprocal therein along the axis of the first shaft; wherein the means for measuring the face angle includes a fourth block slidably received on the second shaft.

16. The device of claim 15, wherein the fourth block includes an indicator pivotally attached thereto to contact the ball hitting face and visually indicate the face angle of a golf club in the first position.

17. The device of claims 15 or 16, wherein the first and second blocks are normally biased apart by a first biasing element.

18. The device of claim 17, wherein the second and fourth blocks are normally biased apart by a second biasing element.

* * * * *